(12) United States Patent
Anerousis et al.

(10) Patent No.: US 8,627,149 B2
(45) Date of Patent: Jan. 7, 2014

(54) TECHNIQUES FOR HEALTH MONITORING AND CONTROL OF APPLICATION SERVERS

(75) Inventors: Nikolaos Anerousis, Chappaqua, NY (US); Elizabeth Ann Black-Ziegelbein, Austin, TX (US); Susan Maureen Hanson, Cary, NC (US); Lily Barkovic Mummert, Mahopac, NY (US); Giovanni Pacifici, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1970 days.

(21) Appl. No.: 10/929,878

(22) Filed: Aug. 30, 2004

(65) Prior Publication Data

US 2006/0048017 A1    Mar. 2, 2006

(51) Int. Cl.
*G06F 11/00*   (2006.01)

(52) U.S. Cl.
USPC .......................................... 714/47.2; 714/4.1

(58) Field of Classification Search
None
See application file for complete search history.

(56) References Cited

U.S. PATENT DOCUMENTS

| | | | |
|---|---|---|---|
| 5,805,785 A | 9/1998 | Dias et al. ........................ 714/4 |
| 6,219,719 B1 | 4/2001 | Graf ................................. 710/1 |
| 6,594,784 B1 | 7/2003 | Harper et al. | |
| 6,609,213 B1 * | 8/2003 | Nguyen et al. ................... 714/4 |
| 6,629,266 B1 | 9/2003 | Harper et al. ................... 714/38 |
| 6,898,556 B2 * | 5/2005 | Smocha et al. ............... 702/186 |
| 6,996,751 B2 * | 2/2006 | Harper et al. ................... 714/48 |
| 7,100,079 B2 * | 8/2006 | Gross et al. ..................... 714/23 |
| 7,243,265 B1 * | 7/2007 | Wookey et al. ................. 714/37 |
| 2002/0087612 A1 * | 7/2002 | Harper et al. ................. 709/100 |
| 2003/0079154 A1 * | 4/2003 | Park et al. ........................ 714/1 |
| 2003/0212928 A1 * | 11/2003 | Srivastava et al. ............. 714/47 |

FOREIGN PATENT DOCUMENTS

JP        2002252614 A    9/2002

OTHER PUBLICATIONS

Huang, Y., et al., "Software rejuvenation: analysis, module and applications" Twenty-fifth International Symposium on Fault-tolerant Computing, Digest of Papers 27-30, Pasadena, CA, USA, pp. 381-390 (Jun. 1995).
Brewer E.A., "Lessons from Giant-Scale Services," IEEE Internet Computing, pp. 46-55 (2001).
Gamache et al., "Windows NT Clustering Service," IEEE Computer, pp. 55-62 (Oct. 1998).
Garg et al., "On the Analysis of Software Rejuvenation Policies," IEEE, pp. 88-96 (1997).
Huang et al., "Software Rejuvenation: Analysis, Module and Applications," IEEE Twenty-Fifth International Symposium on Fault-Tolerant Computing, pp. 381-390 (1995).

* cited by examiner

*Primary Examiner* — Michael Maskulinski
(74) *Attorney, Agent, or Firm* — Ryan, Mason & Lewis, LLP

(57) ABSTRACT

Techniques for improving application server performance and availability are provided. In one aspect, a method of monitoring the health of one or more application servers comprises the following steps. One or more health classes are specified, each of the one or more health classes defining one or more health policies for the one or more application servers. At least one of the one or more health policies is monitored. Violations, if any, of the one or more health policies are detected.

21 Claims, 7 Drawing Sheets

100

200

400

MONITOR HEALTH CLASS

600

700

800

900

1220

TECHNIQUES FOR HEALTH MONITORING AND CONTROL OF APPLICATION SERVERS

FIELD OF THE INVENTION

The present invention relates to improved application server performance and availability and, more particularly, to techniques for monitoring the health of application servers.

BACKGROUND OF THE INVENTION

Application server environments are prone to a variety of problems, e.g., malfunctions, caused by the inefficient design of hosted applications. Typical problems include memory leaks, deadlocks, inconsistent state and user errors. These deficiencies have an adverse effect on the near-term performance and/or availability of the application. In most cases, these conditions can be detected through appropriate instrumentation by a human administrator, who in turn decides on the best course of action to correct the problem.

Each condition requires a particular corrective action that ranges from non-intrusive software reconfiguration to more drastic techniques, such as restarting the application server and its hosted applications. The latter is also known as "software rejuvenation," and is commonly used to remedy many software problems, including, memory leaks and deadlocks. See, for example, Y. Huang, et al., *Software Rejuvenation: Analysis, Module and Applications*, IEEE Twenty-Fifth International Symposium on Fault-Tolerant Computing, 381-390 (1995), the disclosure of which is incorporated herein by reference. A system can selectively rejuvenate software based on measurements that indicate an impending outage. See, for example, U.S. Pat. No. 6,629,266 issued to R. E. Harper et al., entitled "Method and System for Transparent Symptom-Based Selective Software Rejuvenation," the disclosure of which is incorporated herein by reference. If the system is part of a cluster, the system may determine whether another cluster member can accept the workload serviced by the application requiring rejuvenation. If so, the system can interact with a cluster manager to start an instance of the application on another node.

In cluster systems, such as the Windows NT® cluster system, failure detection is provided for applications running unmodified on a cluster. See, for example, R. Gamache et al., *Windows NT Clustering Service*, IEEE COMPUTER, 55-62 (October 1998), the disclosure of which is incorporated herein by reference. An application-specific cluster interface layer, through which an application can be started, stopped and monitored for failures, may also be provided. For example, a monitor may include application requests that serve as probes to determine if the application is operating correctly.

An extensible infrastructure for detecting and recovering from failures in a cluster system is described, for example, in U.S. Pat. No. 5,805,785 issued to D. Dias et al., entitled "Method for Monitoring and Recovery of Subsystems in a Distributed/Clustered System," the disclosure of which is incorporated herein by reference. Basic failure detection using heartbeating (e.g., noting nodes that have gone down or come up on a particular network) is augmented by user-defined monitors to detect failures in specific subsystems, and user-defined recovery programs to recover from the failures detected. A "rolling upgrade" in which upgrades in a cluster are performed in a wave so that only one node is unavailable at a time is described, for example, in E. A. Brewer et al., *Lessons from Giant-Scale Services*, IEEE INTERNET COMPUTING, 46-55 (July/August 2001), the disclosure of which is incorporated herein by reference.

Despite the recent progress in application server failure detection and rejuvenation, there exists a need for improved techniques for efficiently and effectively monitoring application server environments and addressing errors occurring therein.

SUMMARY OF THE INVENTION

The present invention provides techniques for improving application server performance and availability. In one aspect of the invention, a method of monitoring the health of one or more application servers comprises the following steps. One or more health classes are specified, each of the one or more health classes defining one or more health policies for the one or more application servers. At least one of the one or more health policies is monitored. Violations, if any, of the one or more health policies are detected.

A more complete understanding of the present invention, as well as further features and advantages of the present invention, will be obtained by reference to the following detailed description and drawings.

DETAILED DESCRIPTION OF PREFERRED EMBODIMENTS

Figure 1:
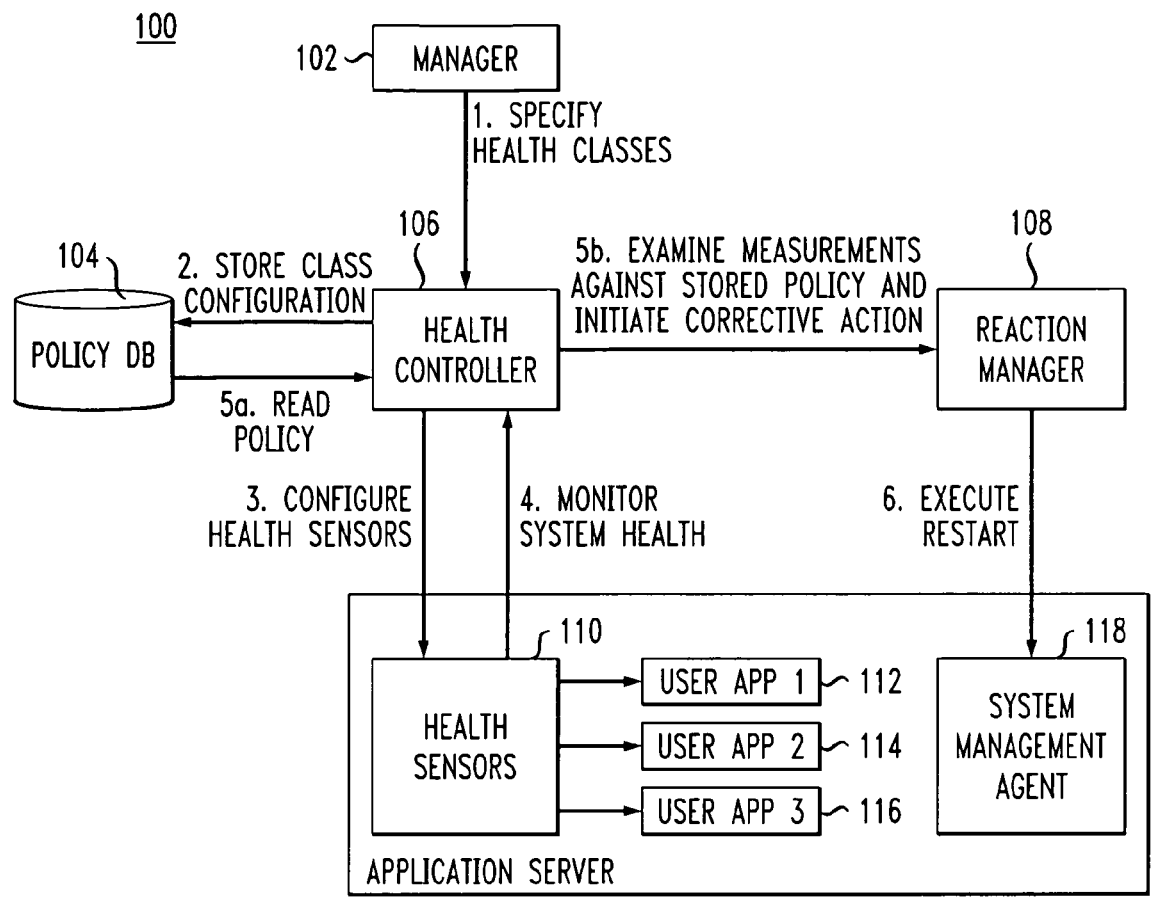
FIG. 1 is a diagram illustrating an exemplary system for monitoring the health of an application server according to an embodiment of the present invention.

FIG. 1 is a diagram illustrating an exemplary system 100 for monitoring the health of an application server. The term "health," as used herein denotes the overall well-being and performance of the system and is defined by one or more health classes that are applied to servers of the system. System 100 comprises manager 102, policy database 104, health controller 106, reaction manager 108, health sensors 110, user applications 112, 114 and 116 and system management agent 118. Health sensors 110, user applications 112, 114 and 116 and system management agent 118 comprise an application server of system 100. In an exemplary embodiment, system 100 comprises one or more application servers, each of which host J2EE applications.

According to an exemplary embodiment of the present invention, system 100 is configured to implement a methodology for monitoring the health of an application server, which may include detecting and/or reacting to specific health problems. Namely, in step 1, manager 102 initially specifies a health class. As will be described in detail below, a given health class can define one or more health monitoring policies for the application server, using a rule-based description. In step 2, the configuration of the specified health class is stored, e.g., in policy database 104.

In step 3, optional health sensors are configured to monitor the health of an application server. Namely, the health policies specify what attributes of the operating environment will be monitored, the particular boundary health conditions that will trigger a policy violation, e.g., health exception, and/or the operations that are to be performed to correct the condition that triggered the violation. Therefore, in step 4, the health policies are monitored. Monitoring the health policies involves first reading the health policies, e.g., from policy database 104, as in step 5a, and then, if a violation of a health policy is detected, initiate a corrective action, as in step 5b. An exemplary corrective action may include, but is not limited to, executing a restart of the application server, as in step 6.

A condition that will trigger a health exception (a triggering condition), e.g., a health policy violation, for example, may be a generalized attribute-value assertion on data observed from health sensors 110, e.g., sensor data. Namely, the triggering condition can be a simple equality clause, or, alternatively, a complex processing operation on multiple pieces of sensor data (for example, in an exemplary embodiment an error condition is detected when about ten percent threshold crossings are observed over about a 60 minute period). Processing sensor data, e.g., against policy database 104, may include, but is not limited to, applying statistical functions, applying assertions on the ordering (partial or total) of system events and scoping (including or excluding parts of the system under observation).

The health policy for a particular system is expressed in a policy specification language, and is then passed to a health controller, e.g., health controller 106. Health controller 106 is responsible for implementing that health policy during normal operation of the system. Health controller 106 stores the health policy in policy database 104 (a local repository) and configures the appropriate health sensors 110 within the managed system to obtain the relevant system data. The identification of what health sensors 110 to configure, and with what parameters, can be expressed in the health policy itself, or alternatively, can be derived automatically from the health policy specification after a compilation process.

During system operation, health controller 106 periodically collects data from health sensors 110, performs the required aggregations and statistical processing of the data and verifies the data against the stored health policies, e.g., in policy database 104. If a health violation is detected, a reaction to the violation may be issued. The reaction will reconfigure and tune the system 100 in such a way, e.g., that service is maintained.

Figure 2:
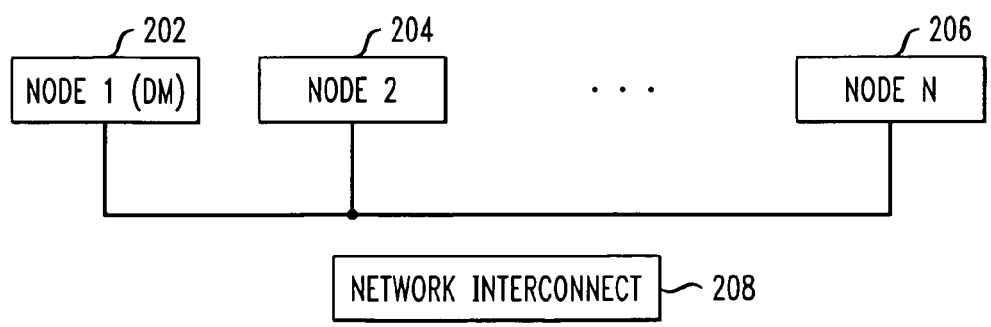
FIG. 2 is a diagram illustrating an exemplary application server environment according to an embodiment of the present invention.

FIG. 2 is a diagram illustrating an exemplary application server environment 200. Application server environment 200 comprises nodes 202, 204 and 206 connected via network interconnect 208. According to an exemplary embodiment of the present invention, each of nodes 202, 204 and 206 contains a copy of the application server software according to the type of function that the node performs.

Application server environment 200 comprises the following exemplary types of nodes. Node 202 comprises an administrative node responsible for performing management functionality for the rest of the application server environment. Nodes 204 and 206 comprise application server nodes. According to the teachings presented herein, application server environment 200 comprises a plurality of application server nodes. Each application server node can host one or more application server instances. In turn, each application server instance can host zero or more enterprise application modules (also referred to herein as "applications").

Figure 3:
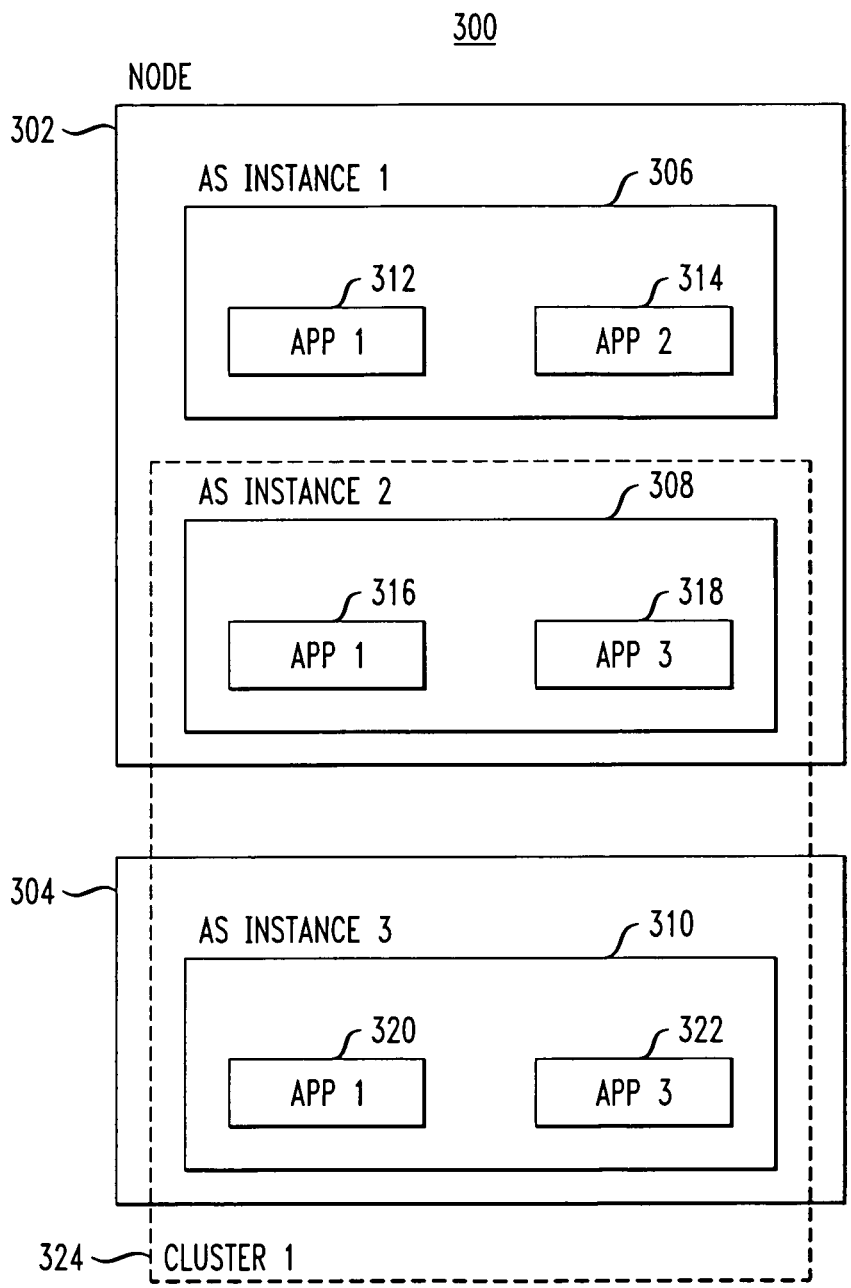
FIG. 3 is a diagram illustrating an exemplary computer system comprising application servers and clusters according to an embodiment of the present invention.

FIG. 3 is a diagram illustrating exemplary computer system 300 comprising application servers and clusters. Namely, computer system 300 comprises application server nodes 302 and 304. Application server node 302 hosts application server instances 306 and 308. Application server instance 306 hosts applications 312 and 314. Application server instance 308 hosts applications 316 and 318. Application server node 304 hosts application server instance 310. Application server instance 310 hosts applications 320 and 322. Application server instances 308 and 310 form cluster 324.

The environment of computer system 300 allows the following groupings of application server instances. "Singleton" application server instances, e.g., application server instance 306, run independently of other application server instances and contain a single copy of an application. "Clustered" application server instances ("clusters"), e.g., application server instances 308 and 310, run multiple copies of an application server instance on one or more nodes. Clusters can be further distinguished into static clusters and dynamic clusters. Specifically, the number of running application server instances in a dynamic cluster is determined at runtime and is based on an observed demand for an application, whereas with static clusters the number of servers is set at configuration.

Figure 4:
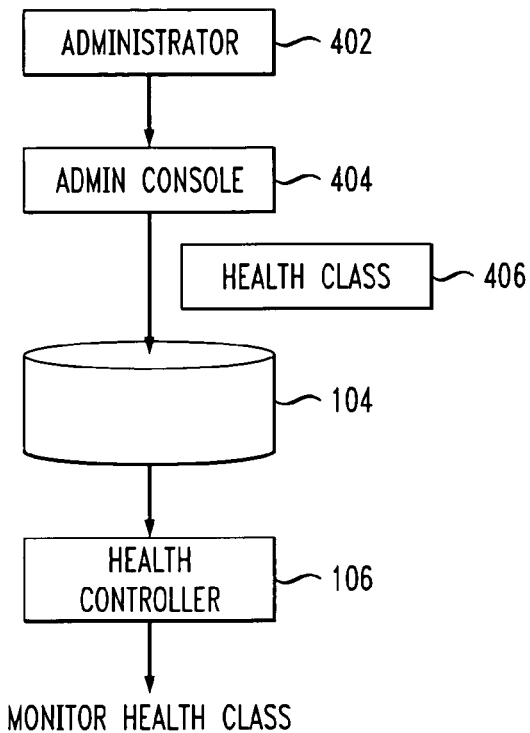
FIG. 4 is a diagram illustrating an exemplary system for defining a health policy according to an embodiment of the present invention.

The health controller, e.g., health controller 106, as described in conjunction with the description of FIG. 1 above, is responsible for monitoring the health status of application server instances. There are two aspects of a health controller operation, namely, a configuration phase and a runtime phase. In the configuration phase, a health policy is defined. FIG. 4 is a diagram illustrating an exemplary system 400 for defining a health policy.

Namely, as shown in FIG. 4, administrator 402, using administrator console 404, defines a number of health classes 406. Each health class 406 contains a set of targets (e.g., members of one or more health classes) and a health policy to be applied to the targets. The targets and the health policies can be modified dynamically. The health policy includes one or more health conditions to be monitored, the corrective action to be taken and the reaction mode. This information becomes part of policy database 104 and is stored into health controller 106, which in turn monitors the respective health classes.

Figure 5:
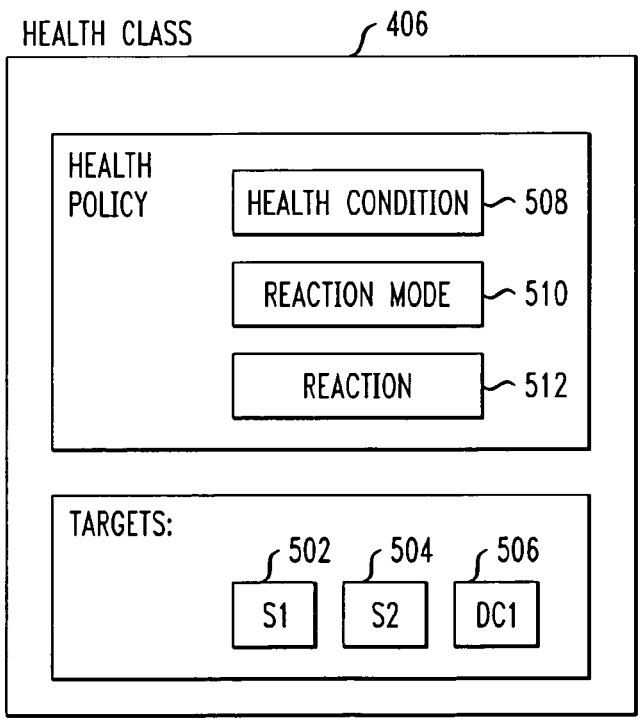
FIG. 5 is a diagram illustrating an exemplary health class according to an embodiment of the present invention.

FIG. 5 is a diagram illustrating an exemplary health class. Namely, health class 406 is shown to contain targets 502, 504 and 506 and health policies 508, 510 and 512, e.g., representing a health condition, a reaction mode and a reaction, respectively. The target of a health class, e.g., targets 502, 504 and 506, can include one or more individual application servers (S), clusters or dynamic clusters (DC). When a cluster or dynamic cluster is specified as a target, the health class automatically applies to all application servers that are members of that cluster or dynamic cluster, including application servers added to that cluster or dynamic cluster after the health class is created. The target of a health class can include all the nodes in the administrative domain. In the instance wherein the target of a health class includes all the nodes in the administrative domain, the health class would only have a single target and the health class would automatically apply to any application servers added after creation of the health class.

A health condition is an erroneous state in hardware and/or software that indicates a present or anticipated malfunction. Examples of health conditions include, but are not limited to, very high memory usage or high percentages of requests encountering internal server errors. In conventional systems, during the course of operation of application server environments, the operator would monitor the system for such conditions, and when detected take corrective action. The present techniques provide a fully automated way of reacting to such problems.

According to an exemplary embodiment of the present invention, one or more of the following health conditions are monitored, which include, but are not limited to, the age of an application server (e.g., the time since startup), the work performed (e.g., the number of served requests), a memory usage pattern indicating an impending resource problem and unusually long response times of requests indicating internal server errors (such as deadlocks).

A health class monitors exactly one health condition, e.g., health condition 508, the health condition itself being tied to one or more low-level health parameters, including, but not limited to, memory heap size and request response time. For detection purposes, the health class specifies the desired boundaries for these low-level health parameters. The low-level health parameters are evaluated periodically and, if a violation is detected, the health condition is triggered. The health controller then takes the corrective action specified by the health class.

The reaction mode, e.g., reaction mode 510, defines how the system reacts in the presence of a detected health condition, e.g., health condition 508. In this exemplary embodiment, the reaction mode is used to execute the corrective action in one of three possible ways: (1) detection only, wherein a diagnostic message is produced upon detection of the condition, (2) supervised reaction, wherein a message is sent to the administrator with a suggestion of a corrective action or (3) automatic reaction, wherein a reaction to the condition is scheduled for execution immediately.

Figure 6:
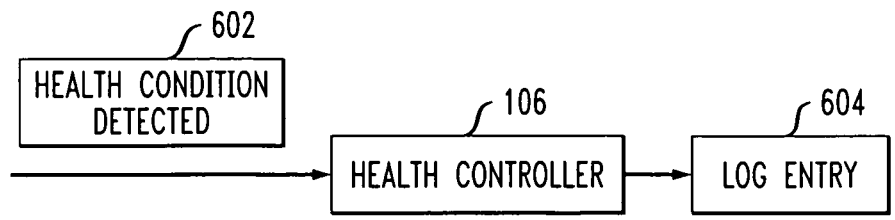
FIG. 6 is a diagram illustrating an exemplary detection only reaction according to an embodiment of the present invention.

FIG. 6 is a diagram illustrating an exemplary detection only reaction. In the detection only reaction 600 shown in FIG. 6, one or more health conditions 602 are detected, collected by health controller 106 and then a log entry 604 is made.

Figure 7:
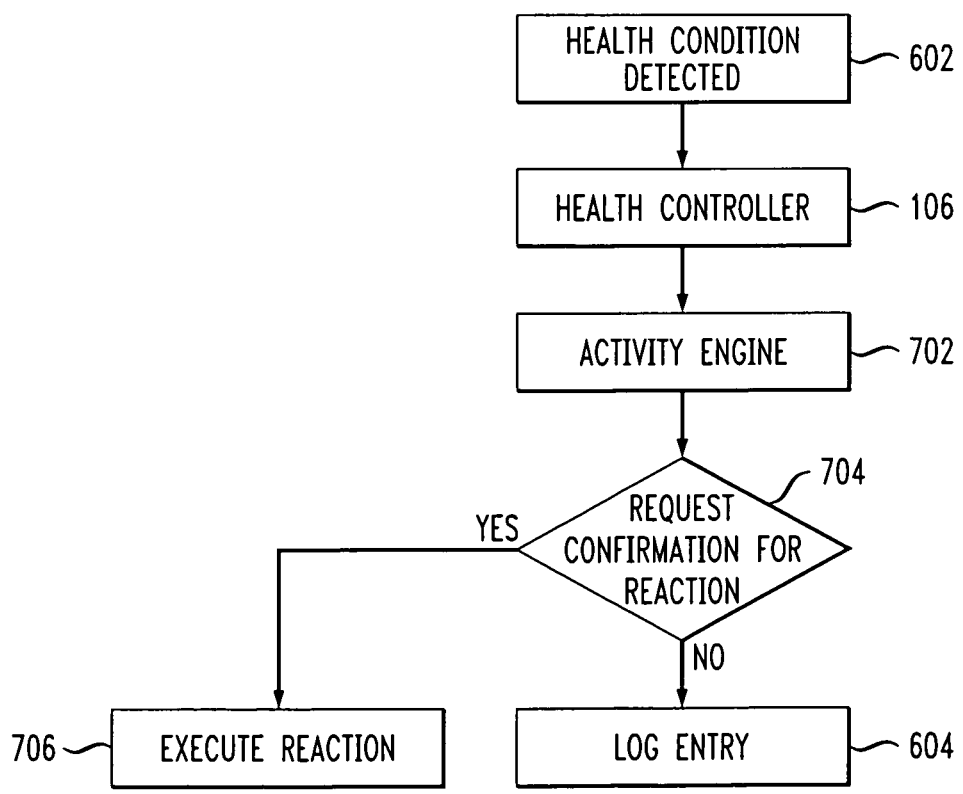
FIG. 7 is a diagram illustrating an exemplary supervised reaction according to an embodiment of the present invention.

FIG. 7 is a diagram illustrating an exemplary supervised reaction. In the supervised reaction 700 shown in FIG. 7, one or more health conditions 602 are detected and then collected by health controller 106 which submits a request to an activity engine, e.g., activity engine 702. Activity engine 702 is a component which receives actionable messages from within the application server environment that require the attention of a human administrator and provides the option of acknowledging the reception and/or approving corrective action(s). Activity engine 702 then makes a request 704 for confirmation of a reaction, e.g., request user to approve corrective action. If the reaction is confirmed, then execution of the reaction 706 is conducted. Alternatively, if the reaction is not confirmed, then a log entry 604, as in the detection only reaction, above, is made.

According to the exemplary embodiment shown in FIG. 7, reactions are limited to restarting the application server on which the erroneous condition was observed. This process is also known as software rejuvenation. The system architecture however, is not limited solely to rejuvenation actions, but can be used to signal any kind of automatic or supervised corrective action.

Figure 8:
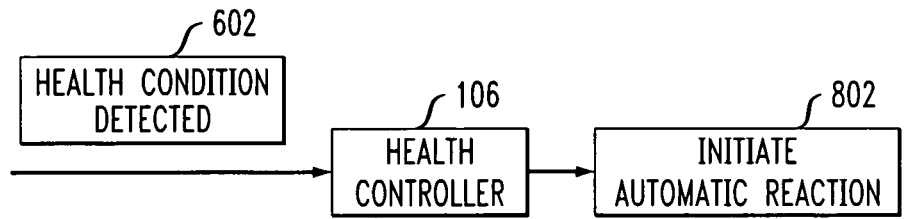
FIG. 8 is a diagram illustrating an exemplary automatic reaction according to an embodiment of the present invention.

FIG. 8 is a diagram illustrating an exemplary automatic reaction. In the automatic reaction 800 shown in FIG. 8, one or more health conditions 602 are detected and then collected by health controller 106, as in the detection only and the supervised reactions, described above. An automatic reaction 802 is then initiated.

Regarding the runtime phase of a health controller operation, the health controller, e.g., health controller 106 of FIG. 4, described above, reads each defined health class, e.g., health class 406 of FIG. 5, described above, and configures a health subsystem for every target, e.g., targets 502, 504 and 506 of FIG. 5, above, of the health class. The health subsystem is a high-level construct responsible for monitoring the health condition specified in the health class.

The health subsystem hides the low-level details of health data collection by presenting a simple application program interface (API) to the health controller to determine if the health condition has been violated for the health class. In turn, the health subsystem configures one or more low-level sensors to obtain the necessary health data.

Figure 9:
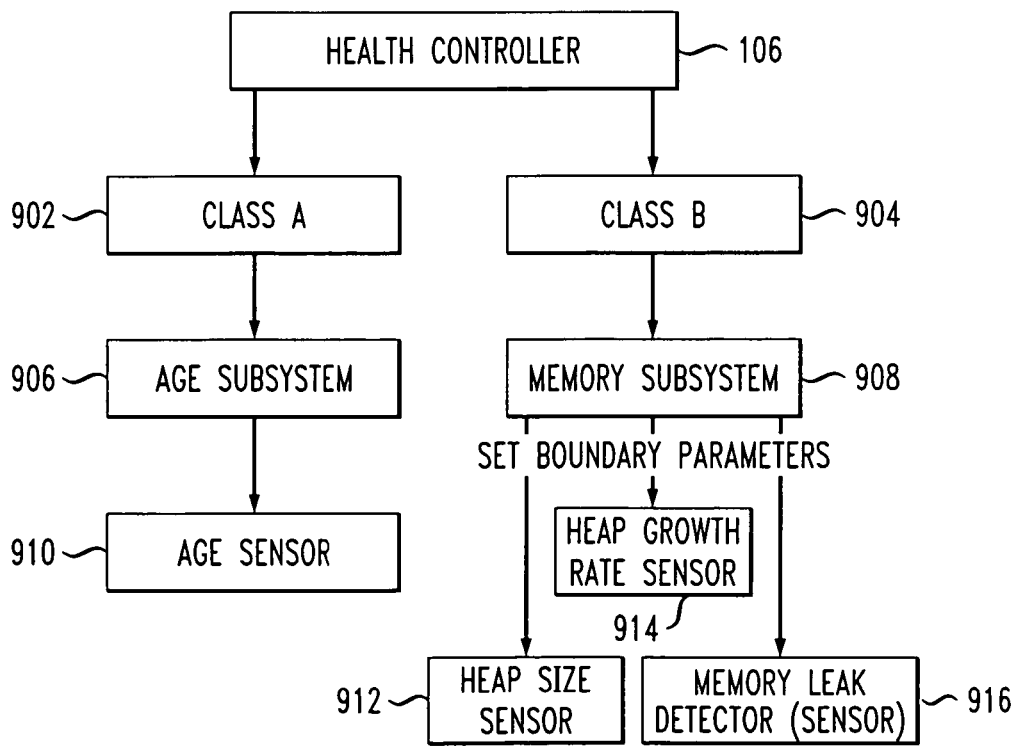
FIG. 9 is a diagram illustrating an exemplary health subsystem configuration according to an embodiment of the present invention.

FIG. 9 is a diagram illustrating an exemplary health subsystem configuration. In FIG. 9, health subsystem 900 is configured to implement health class A 902 and health class B 904.

For the targets of health class A 902, health controller 106 instantiates age subsystem 906, which in turn configures age sensor 910 with the desired boundary (e.g., the maximum allowed age). Similarly, every target of health class B 904 requires the configuration of memory subsystem 908 to detect erroneous memory usage patterns. Memory subsystem 908 in turn initializes memory heap size sensor 912, heap growth rate sensor 914 and memory leak sensor 916. The sensors continuously compute these quantities, e.g., memory heap size, heap growth rate and memory leak, using instrumentation available through the operating system or the application server environment. If the configured boundary conditions for any one of sensors 912, 914 or 916 are violated, memory subsystem 908 will raise a flag, which will subsequently trigger the reaction specified in the health class (e.g., an application server restart).

Figure 10:
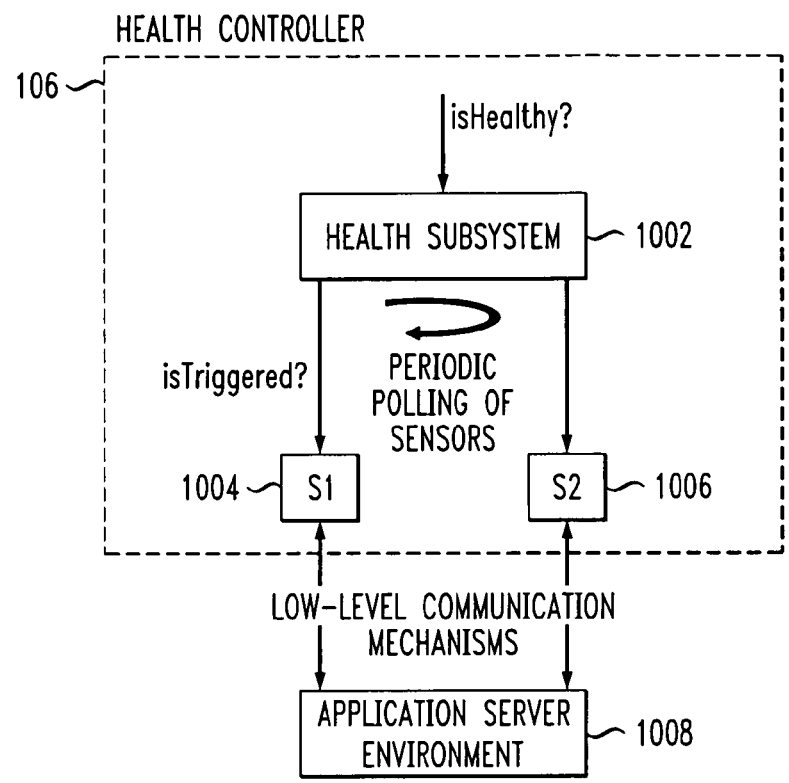
FIG. 10 is a diagram illustrating an exemplary health subsystem runtime operation according to an embodiment of the present invention.

FIG. 10 is a diagram illustrating exemplary health subsystem runtime operation 1000. Specifically, health subsystem 1002 periodically checks the health sensors, e.g., sensors 1004 and 1006, for violations of boundary health conditions. For conditions involving single sensors, the subsystem can check for a violation by performing an assertion on the triggered condition (is Triggered) on its health sensors. For conditions involving multiple sensors, the subsystem may require a multitude of health sensors to be in the triggered state for a violation to occur, or it may poll sensors for data to determine if the condition is violated.

Once configured, each health sensor operates independently, and periodically collects health-related data from the target using communication mechanisms specific to application server environment 1008. The health-related data obtained is checked with respect to the boundary parameters specified in the health class.

Exemplary health sensor boundary health conditions include, but are not limited to, maximum allowed server age (e.g., up to about 48 hours), maximum work performed (e.g., up to about 100,000 requests), maximum heap size (e.g., up to about 200 megabytes) and maximum response time allowed (e.g., up to about five seconds for about 95 percent of incoming requests).

Figure 11:
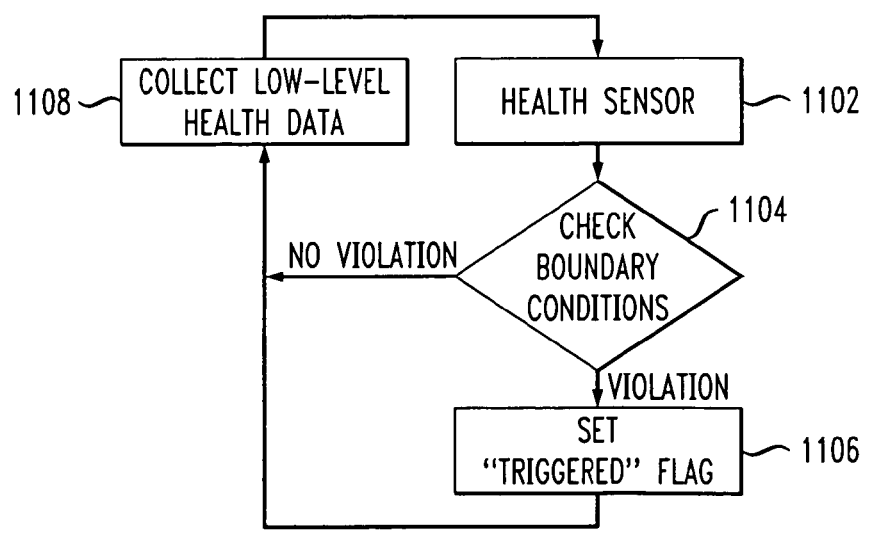
FIG. 11 is a diagram illustrating an exemplary health sensor operation according to an embodiment of the present invention.

FIG. 11 is a diagram illustrating an exemplary health sensor operation. In FIG. 11, boundary health conditions 1104 are checked by health sensors 1102. If a violation of a boundary health condition is detected, a flag (trigger) 1106 is raised within the sensor and low-level health data 1108 is collected. Alternatively, if no violation of a boundary health condition is detected, then only low-level health data 1108 is collected.

The health controller periodically polls its subsystems, which in turn check the sensors. If the subsystem for a server is determined to be unhealthy, the health monitor initiates a reaction. This process is performed for all configured subsystems and sensors.

Of particular importance are the runtime characteristics of the health controller. In a live application server environment, configurations may constantly change. For example, nodes may be added and/or removed, application server instances may be installed and/or removed from nodes and cluster membership may change.

A component within the health controller, e.g., a topology manager, can be employed to observe the application server environment by 'listening' to configuration events from selected components and reacting appropriately. For example, when a new health class is created, the health controller creates a number of subsystems and sensors to obtain data from the class targets. When a health class is deleted, the corresponding health subsystems are destroyed by the health controller and observation of the health parameters from the corresponding targets stops. When a new target is added to a health class, the appropriate health subsystem is configured for that server and added to the list of health subsystems under observation. When a target is removed from a health class, the corresponding health subsystem is destroyed. When the membership of a target changes (e.g., as is applicable to cluster systems), the appropriate health subsystems are added and/or removed.

Because a target of a health class can be a server or a group of servers, it is possible to create multiple health classes on a server at different levels that monitor the same health conditions. For example, one can create a health class A that monitors the age of a cluster, with an instruction to restart if the age exceeds some value Y. Another class B may be created that monitors the age of a server that is a member of the cluster in health class A, with an instruction to restart if the age exceeds some other value X. In this case, the health classes conflict. The health controller detects such conflicts and uses a precedence rule to determine which health class to apply. According to the teachings herein, a conflict occurs when multiple health classes with the same condition type (e.g., age or work), corrective action and reaction mode are defined for a given server.

When a conflict occurs, the health controller applies the health class with the narrowest scope. In an exemplary embodiment, a single server is the narrowest scope, followed by a cluster and then an administrative domain. Additionally, users are prevented from defining classes that conflict at the same scope. For example, a non-conflicting set of conditions according to this definition would be an administrative domain health class that sends a notification on violation of a memory condition, and a cluster health class that automatically restarts servers on violation of a memory condition. If both of these health classes had automatic restarts as the reaction, they would conflict, and the cluster health class would apply to servers in the cluster.

The health controller operates according to a set of configuration parameters that govern its runtime behavior. These configuration parameters include, but are not limited to, length of the control cycle (e.g., the time period between successive polling of the health subsystems), restart timeout (e.g., the maximum time allowed for a restart to occur; if the timeout is exceeded the restart is deemed as failed and the health controller retries the operation), maximum number of server restarts (e.g., the maximum number of unsuccessful tries to restart a server, after which, an error is logged), minimum restart interval (e.g., the minimum time between consecutive attempts to restart a server, which prevents unnecessary frequent restarts) and constraining restart times (e.g., a list of time periods during which a restart is prohibited, such as, during peak business hours).

The restart timeout, maximum number of server restarts, minimum restart interval and prohibited restart times parameters control the behavior of the server restart reaction. However, in cluster server applications, at least one running instance is preferably always preserved, and in dynamic cluster applications, a user-specified minimum number of instances is preferably always preserved.

Figure 12:
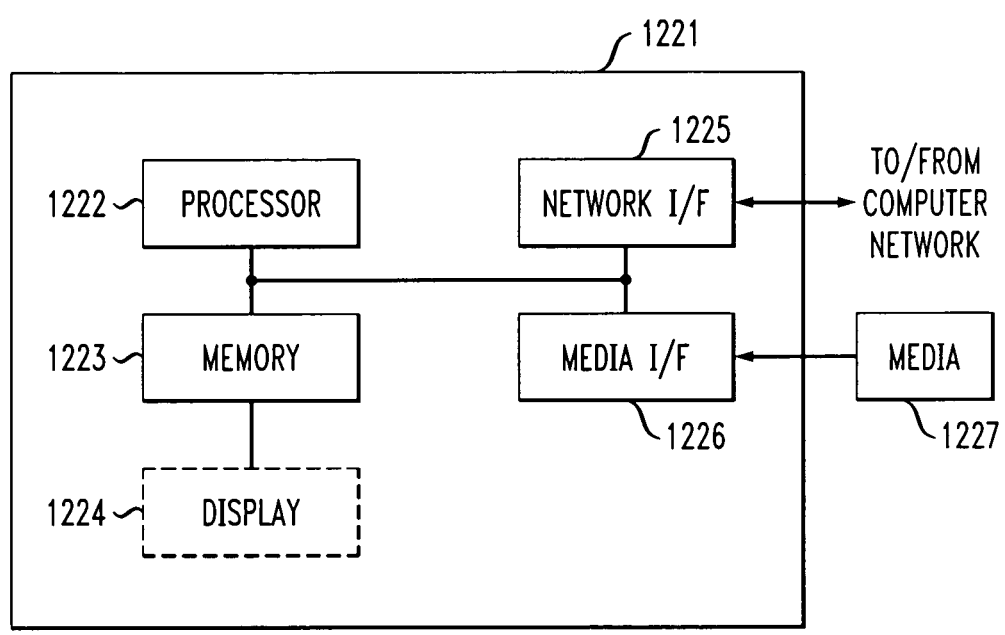
FIG. 12 is a diagram illustrating an exemplary system for monitoring the health of one or more application servers according to an embodiment of the present invention.

FIG. 12 is a diagram illustrating an exemplary system for monitoring the health of one or more application servers. Apparatus 1220 comprises a computer system 1221 that interacts with media 1227. Computer system 1221 comprises a processor 1222, a network interface 1225, a memory 1223, a media interface 1226 and an optional display 1224. Network interface 1225 allows computer system 1221 to connect to a network, while media interface 1226 allows computer system 1221 to interact with media 1227, such as a Digital Versatile Disk (DVD) or a hard drive.

As is known in the art, the methods and apparatus discussed herein may be distributed as an article of manufacture that itself comprises a computer-readable medium having computer-readable code means embodied thereon. The computer-readable program code means is operable, in conjunction with a computer system such as computer system 1221, to carry out all or some of the steps to perform one or more of the methods or create the apparatus discussed herein. For example, the computer-readable code is configured to implement a method of monitoring the health of one or more application servers by the steps of: monitoring at least one of one or more health policies for the one or more application servers, the one or more health policies being defined by one or more specified health classes; and detecting violations, if any, of the one or more health policies. The computer-readable medium may be a recordable medium (e.g., floppy disks, hard drive, optical disks such as a DVD, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk.

Memory 1223 configures the processor 1222 to implement the methods, steps, and functions disclosed herein. The memory 1223 could be distributed or local and the processor 1222 could be distributed or singular. The memory 1223 could be implemented as an electrical, magnetic or optical memory, or any combination of these or other types of storage devices. Moreover, the term "memory" should be construed broadly enough to encompass any information able to be read from or written to an address in the addressable space accessed by processor 1222. With this definition, information on a network, accessible through network interface 1225, is still within memory 1223 because the processor 1222 can retrieve the information from the network. It should be noted that each distributed processor that makes up processor 1222 generally contains its own addressable memory space. It should also be noted that some or all of computer system 1221 can be incorporated into an application-specific or general-use integrated circuit.

Optional video display 1224 is any type of video display suitable for interacting with a human user of apparatus 1220. Generally, video display 1224 is a computer monitor or other similar video display.

Although illustrative embodiments of the present invention have been described herein, it is to be understood that the invention is not limited to those precise embodiments, and that various other changes and modifications may be made by one skilled in the art without departing from the scope or spirit of the invention.

What is claimed is:

1. A method of monitoring the health of one or more application servers, the method comprising the steps of:
   specifying one or more health classes, each of the one or more health classes defining one or more health policies for the one or more application servers, wherein each health policy comprises one or more health conditions to he monitored, a boundary health condition that will trigger a policy violation, a corrective action to be taken and a reaction mode;
   configuring multiple health sensors, wherein each of the multiple health sensors is configured to correspond to a single respective health condition from a collection of health conditions including at least maximum allowed server age, maximum work performed, maximum heap size and maximum response time allowed, and wherein each of the multiple health sensors operates independently to collect data;
   defining one or more targets of the one or more health classes;
   applying the one or more health policies to the one or more targets;
   monitoring at least one of the one or more health policies that have been applied to the one or more targets, wherein monitoring comprises using the multiple configured health sensors to collect data pertaining to each of the multiple respective health conditions; and
   detecting violations, if any, of the one or more health policies, wherein detecting violations comprises verifying the data collected against the boundary health condition.

2. The method of claim 1, further comprising the step of storing configurations of the health classes.

3. The method of claim 1, further comprising the step of taking corrective action based on the violations detected.

4. The method of claim 3, wherein the step of taking corrective action based on the violations detected further comprises rejuvenation of at least one of the one or more application servers.

5. The method of claim 1, further comprising the step of taking automatic corrective action based on the violation detected.

6. The method of claim 1, further comprising the step of requesting user approval to take corrective action based on the violation detected.

7. The method of claim 1, wherein the step of monitoring at least one of the one or more health policies comprises monitoring one or more predetermined attributes of the one or more application servers.

8. The method of claim 1, wherein the step of detecting violations comprises detecting violations based on one or more health conditions.

9. The method of claim 1, wherein the step of detecting violations comprises detecting violations based on one or more health conditions selected from the group comprising of age of an application server, work performed, memory usage patterns and unusually long response times of request.

10. The method of claim 1, further comprising the step of implementing the one or more health policies on a computer system.

11. The method of claim 10, wherein the step of implementing the one or more health policies on a computer system comprises use of a health controller.

12. The method of claim 1, wherein the step of monitoring at least one of the one or more health policies comprises use of one or more health sensors automatically configured to monitor the one or more health policies.

13. The method of claim 1, wherein the step of detecting violations further comprises the step of producing a diagnostic message.

14. The method of claim 1, further comprising the step of employing a topology manager to monitor one or more of an addition of a health class, a deletion of a health class and a modification of a health class.

15. The method of claim 1, further comprising the step of employing a topology manager to monitor one or more of an addition of a target and a deletion of a target.

16. The method of claim 1, further comprising the step of employing a topology manager to monitor changes in cluster membership.

17. The method of claim 1, further comprising the step of resolving conflicts between health classes by selecting the health class with the narrowest scope.

18. An apparatus for monitoring the health of one or more application servers, the apparatus comprising:
   a memory; and
   at least one processor, coupled to the memory, operative to:
      specify one or more health classes, each at the one or more health classes defining one or more health policies for the one or more application servers, wherein each health policy comprises one or more health conditions to be monitored, a boundary health condition that will trigger a policy violation, a corrective action to be taken and a reaction mode;
      configure multiple health sensors, wherein each of the multiple health sensors is configured to correspond to a single respective health condition from a collection of health conditions including at least maximum allowed server age, maximum work performed, maximum heap size and maximum response time allowed, and wherein each of the multiple health sensors operates independently to collect data;
      define one or more targets of the one or more health classes;
      apply the one or more health policies to the one or more targets;
      monitor at least one of the one or more health policies that have been applied to the one or more targets, wherein monitoring comprises using the multiple configured health sensors to collect data pertaining to each of the multiple respective health conditions; and detect violations, if any, of the one or more health policies, wherein detecting violations comprises verifying the data collected against the boundary health condition.

19. The apparatus of claim 18, wherein the at least one processor is further operative to take corrective action based on the violations detected.

20. An article of manufacture for monitoring the health of one or more application servers, comprising a machine readable recordable medium containing one or more programs which when executed implement the steps of:

specifying one or more health classes, each of the one or more health classes defining one or more health policies for the one or more application servers, wherein each health policy comprises one or more health conditions to be monitored, a boundary health condition that wilt trigger a policy violation, a corrective action to be taken and a reaction mode;

configuring multiple health sensors, wherein each of the multiple health sensors is configured to correspond to a single respective health condition from a collection of health conditions including at least maximum allowed server age, maximum work performed, maximum heap size and maximum response time allowed, and wherein each of the multiple health sensors operates independently to collect data;

defining one or more targets of the one or more health classes;

applying the one or more health policies to the one or more targets;

monitoring at least one of the one or more health policies that have been applied to the one or more targets, wherein monitoring comprises using the multiple configured health sensors to collect data pertaining to each of the multiple respective health conditions; and detecting violations, if any, of the one or more health policies, wherein detecting violations comprises verifying the data collected against the boundary health condition.

21. The article of manufacture of claim 20, further comprising the step of taking corrective action based on the violations detected.

\* \* \* \* \*